US011082089B2

(12) United States Patent
Hobbel (10) Patent No.: US 11,082,089 B2
(45) Date of Patent: Aug. 3, 2021

(54) SINGLE-ENDED VECTORED DSL SYSTEM

(71) Applicant: NewWire Systems, Inc., Larkspur, CA (US)

(72) Inventor: Jan C. Hobbel, Larkspur, CA (US)

(73) Assignee: NewWire Systems, Inc., Larkspur, CA (US)

(*) Notice: Subject to any disclaimer, the term of this patent is extended or adjusted under 35 U.S.C. 154(b) by 0 days.

(21) Appl. No.: 17/018,696

(22) Filed: Sep. 11, 2020

(65) Prior Publication Data

US 2021/0075468 A1 Mar. 11, 2021

Related U.S. Application Data

(60) Provisional application No. 62/899,119, filed on Sep. 11, 2019.

(51) Int. Cl.
*H04B 3/32* (2006.01)
*H04B 3/50* (2006.01)
(Continued)

(52) U.S. Cl.
CPC ............ *H04B 3/32* (2013.01); *H04B 3/50* (2013.01); *H04L 5/0007* (2013.01);
(Continued)

(58) Field of Classification Search
CPC .......... H04B 3/32; H04B 3/50; H04L 5/0046; H04L 27/2628; H04L 25/03006;
(Continued)

(56) References Cited

U.S. PATENT DOCUMENTS 6,522,152 B1 * 2/2003 Tonti ..................... G01R 31/11
324/543
7,639,596 B2 12/2009 Cioffi
(Continued)

OTHER PUBLICATIONS

Ginis and Cioffi, "Vectored Transmission for Digital Subscriber Line Systems," IEEE Journal on Selected Areas in Communications, 20(5):1085-1104, Jun. 2002.
(Continued)

*Primary Examiner* — Steven H Nguyen
(74) *Attorney, Agent, or Firm* — Fish & Richardson P.C.

(57) ABSTRACT

As fiber networks are extended closer to the subscriber, 5G small cell, multi-dwelling units, and office buildings, in some applications Digital Subscriber Line (DSL) becomes an extension for the fiber network over the last 100 to 300 meters of twisted wire-pair telephone lines. Utilizing techniques such as bonding of coterminous twisted wire-pairs, increasing the bandwidth into the VHF spectrum, emerging $5^{th}$ generation DSL technology is poised to deliver aggregate bandwidth approaching 10 Gb/s. Underpinning the capability to reach these speeds over twisted wire-pair, requires Vectored DSL to cancel Far-End crosstalk (FEXT); the dominant impairment to high-speed DSL. Improving on current Vectored DSL technology, both one-sided and two-sided, through utilization of Single-Ended Vectored DSL to cancel FEXT offers significant improvements to several aspects of deploying DSL at gigabit speeds.

11 Claims, 9 Drawing Sheets

(51) Int. Cl.
*H04L 5/00* (2006.01)
*H04L 27/26* (2006.01)
*H04L 25/03* (2006.01)

(52) U.S. Cl.
CPC ...... *H04L 5/0046* (2013.01); *H04L 25/03006* (2013.01); *H04L 27/2628* (2013.01); *H04L 2025/03426* (2013.01)

(58) Field of Classification Search
CPC ........ H04L 5/0007; H04L 2025/03426; H04N 13/122; H04N 13/125
See application file for complete search history.

(56) References Cited

U.S. PATENT DOCUMENTS

| | | | | |
|---|---|---|---|---|
| 2007/0133723 A1* | 6/2007 | Cheong | .................... | H04B 3/32 375/346 |
| 2010/0238785 A1* | 9/2010 | Hobbel | .................. | H04M 3/34 370/201 |
| 2011/0058468 A1* | 3/2011 | Singh | .................... | H04M 3/306 370/201 |
| 2011/0080938 A1* | 4/2011 | Fisher | .................... | H04M 3/34 375/222 |
| 2013/0051488 A1 | 2/2013 | Shridhar et al. | | |
| 2013/0215935 A1* | 8/2013 | Nuzman | .................. | H04B 3/32 375/219 |
| 2013/0215951 A1* | 8/2013 | Nuzman | ................ | H04B 3/487 375/227 |
| 2016/0080031 A1* | 3/2016 | Kassel | .................. | H04B 3/238 379/406.06 |
| 2016/0105215 A1 | 4/2016 | Wang et al. | | |

OTHER PUBLICATIONS

Authorized officer Lee Young, International Search Report and Written Opinion in PCT/US2020/050493, dated Dec. 10, 2020, 11 pages.

* cited by examiner

SINGLE-ENDED VECTORED DSL SYSTEM

CROSS-REFERENCE TO RELATED APPLICATIONS

This application claims the benefit under 35 U.S.C. § 119(e) of the filing date of U.S. Patent Application No. 62/899,119, for "Single-Ended Vectored DSL System," which was filed on Sep. 11, 2019, and which is incorporated here by reference.

BACKGROUND

Field of the Invention

The present invention generally relates to the field of digital communications systems. Specifically, Digital Subscriber Line (DSL) communications systems that are vectored to reduce or eliminate interference between DSL circuits as a result of crosstalk.

Background of Related Art

Digital Subscriber Line (DSL) communications are subject to interference that can substantially reduce the data rate. Crosstalk interference, both Near-End crosstalk (NEXT) and Far-End crosstalk (FEXT), between different DSL lines, located adjacently within a binder, or each in separate but adjacent binders, is one of the dominant forms of interference. Various techniques have been developed to mitigate or cancel crosstalk interference including the use of pre-coding signals to create destructive interference of the crosstalk energy at the receiver of the system also referred to as Vectoring. Systems, apparatus and/or other hardware or software implementations that improve Vectored DSL so that it can reduce or cancel FEXT in addition to NEXT, would represent a significant advancement in the art.

SUMMARY

This specification describes technologies for crosstalk cancellation in Vectored DSL communications systems. These technologies generally involve single-ended vectoring. Single-ended vectoring includes determining near end crosstalk (NEXT) at a transmit side of a system. The single-ended vectoring then uses the determined NEXT to generate a NEXT cancellation vector and then applying the NEXT cancellation vector to outgoing signals to reduce both NEXT and far end cross talk (FEXT).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Definitions

| | |
|---|---|
| ADC | Analog to Digital Converter. |
| Bonded Loops | Multiple DSL Circuits that have their capacity/data aggregated to form one virtual DSL Circuit. |
| CPE | Customer Premises Equipment. |
| DAC | Digital to Analog Converter. |
| Disturber Loop | A twisted-wire pair connecting two DSL transceivers that is the source of crosstalk (NEXT and FEXT) interference. |
| Downstream | Data flow in the direction of Network side to User side of a loop. |
| DPU | Distribution Point Unit. A device with one or more bonded DSL interfaces designed for fiber to the distribution point (FTTdp) or fiber to the node (FTTN) applications. |
| DSL | Digital Subscriber Line. |
| DSL Circuit | A DSL system that consists of a DSL transceiver (FTU-O) located at the network side connected over a loop to a transceiver on the User (FTU-R) side to bearer channel data. |
| DSLAM | Digital Subscriber Line Access Multiplexer. |
| Far-End | The opposite side of the loop. |
| FDM | Frequency Division Multiplexing. Transmit and Receive use non-overlapping frequency spectrum. |
| FEXT | Far-End Crosstalk. |
| Front End | Circuit that provides a 2-wire to 4-wire interface between the loop/twisted wire-pair and the DSL transmitter DAC and a DSL receiver ADC. |
| FTU-O | G.fast DSL transceiver located at the network side, typically within a DSLAM, ONU, or DPU device. |
| FTU-R | G.fast DSL transceiver located at the user side, usually within a CPE or DPU device. |
| G.fast | Name of ITU-T standard G.9701 that describes DSL Systems. |
| Loop | A twisted wire-pair used to connect two DSL transceivers within equipment such as a DSLAM, CPE, and DPU. |

| | |
|---|---|
| NEXT | Near-End Crosstalk. |
| ONU | Optical Node Unit. A device typically fed with fiber from the network with user facing DSL Circuits deployed close to the end subscriber (<3 kft). |
| PMD | Physical Media Dependent Function. |
| PMS-TC | Physical Media Specific Transmission Convergence sublayer. |
| Post-Processing | Used at an aggregation point of multiple CPEs or DPUs, typically in the upstream direction, to cancel crosstalk. |
| Pre-Coding | Pre-distortion used on multiple transmitters with a signal that though destructive interference cancels crosstalk on the victim loop. |
| Showtime | The state of either the FTU-O or FTU-R that is reached after the initialization procedure has been completed in which bearer channel data are transmitted. |
| Single-Ended Vectoring | Vectoring, or the co-processing of multiple DSL Transmitter signals, for the reduction or cancellation of FEXT, utilizing NEXT and without information or coordination with the Far-End. |
| SVCE | Single-Ended Vector Control Entity. |
| TDD | Time Domain Duplexing. Separating transmitters from receivers, utilizing overlapping spectrum, through allocating different time slots for downstream and upstream transmitters. |
| Upstream | Data flow in the direction of User side to Network side of a loop. |
| VCE | Vectoring Control Entity. |
| VDSL | Very-high speed Digital Subscriber Line. As described in ITU-T standards. |
| Vectored Group | Group of transmitters or receivers that are jointly vectored or pre-coded to cancel FEXT and NEXT. |
| VFC | Vectoring Feedback Channel. A channel transported over a DSL Circuit with vector feedback used by the VCE to determine the crosstalk channel matrix. |
| VHF | Very High Frequency Spectrum typically 30-300 MHz. |
| Victim Loop | A twisted-wire pair connecting two DSL transceivers that is the victim of crosstalk (NEXT and FEXT) interference. |

The present specification generally relates to the field of crosstalk cancellation methods for Vectored DSL communications systems.

Telecommunications companies typically have a large installed base of twisted wire-pair infrastructure, initially installed for voice telephone services, and later used to deploy Digital Subscriber Line (DSL) for internet and Internet Protocol Television (IPTV) video services using a Digital Subscriber Line Multiplexers (DSLAM) at the Central Office (CO) connected to a Customer Premises Equipment (CPE) device at the customer's location. Over time, the data rates offered by their DSL service were increased by shortening the loops and deploying optical networks to connect the CO to Optical Network Units (ONU) closer to the customer's CPE. As the loops were shortened and the DSL data rates increased, crosstalk between loops became the dominant source of interference.

Crosstalk

For DSL based communications systems increasing the data rates through shortening the loops, increasing the bandwidth of the spectrum utilized by the DSL, results in increasing levels of crosstalk, or inter-channel interference, that becomes the most significant form of interference between DSL circuits. Therefore mitigation, reduction, or cancellation of crosstalk becomes critical to optimizing the available system data rate.

Figure 1A:
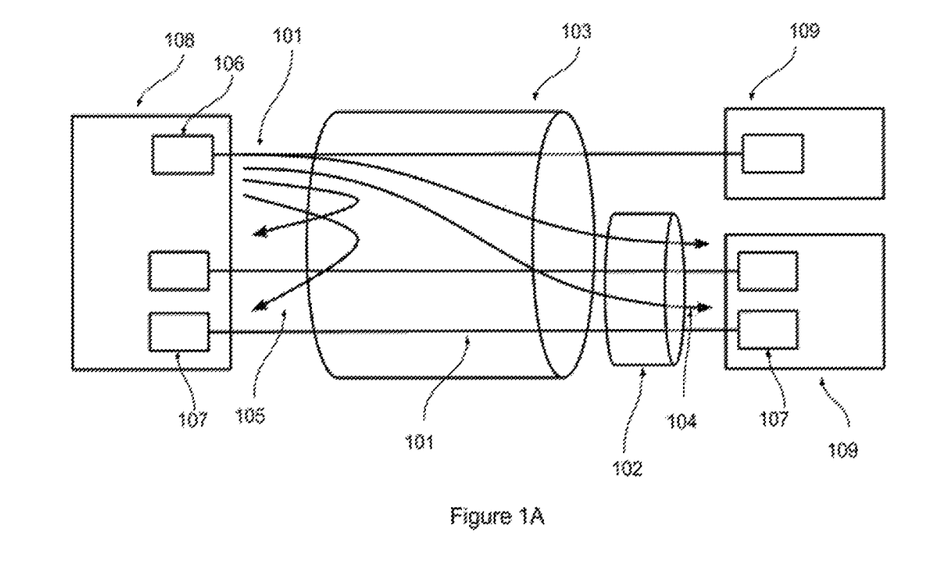
FIGS. 1A-1B are diagrams illustrating examples of Near-End and Far-End crosstalk in the downstream (FIG. 1A) and upstream (FIG. 1B) directions.

As illustrated in FIG. 1A, multiple copper twisted wire-pairs (101) are contained in a binder (102). A binder typically includes 8 to 50 copper twisted wire-pairs bundled together. The bundling of several or more of these binders is used to create larger binder cables (103) with capacities of several hundred to thousands of copper twisted wire-pairs. Typically, there is no shielding to electrically isolate each twisted wire-pair from others resulting in significant levels of crosstalk, both Near-End and Far-End, between them.

Crosstalk is the coupling of electromagnetic energy between two or more neighboring DSL circuits, or loops, and consists of two components described as Far-End crosstalk (FEXT) (104) and Near-End crosstalk (NEXT) (105).

For the purposes of describing the effects of crosstalk, the DSL Circuit (101) with the transmitter (106) and loop that is the source of interference is defined as the disturber loop, and the affected loop with the receiver or receivers (107) experiencing crosstalk interference is referred to as the victim loop.

FEXT is crosstalk sourced from a disturber loop transmitter and coupled into the victim loop that interferes with the receiver located at the Far-End from transmitter on the victim loop. NEXT is crosstalk sourced from a disturber loop transmitter and coupled into victim loop, that interferes with a receiver on the victim loop, located at the same end as the disturber loop transmitter.

If a system has multiple adjacent loops that interfere with each other, a victim loop may have multiple disturber loops. Similarly, each disturber loop may have multiple victim loops. In a typical installation each disturber loop may have 2-10 victim loops located within each binder or binder cable.

Crosstalk coupling between any two loops, meaning regardless which of the twisted wire-pairs is designated as the victim loop or disturber loop, is linear and reciprocal.

Crosstalk may couple from the disturber loop to the victim loop along the entire length, at a specific segment, or multiple segments.

One other aspect of these loops and how they couple energy between each other, is that, at the frequencies or spectrum utilized by DSL, loops behave as transmission lines. Therefore, at segments along the loops at which the disturber loop couples into the victim loop, crosstalk will generate both NEXT and FEXT in the victim loop. Another way of looking at this is where crosstalk occurs, NEXT is the energy that travels back towards the Near-End and FEXT travels towards the Far-End.

Another aspect when discussing crosstalk for DSL systems is the concept of Upstream (US) and Downstream (DS). The convention is that data transported from the Network (108) in the direction of the User (109) end of the loop is referred to as Downstream while data originating from the user endpoint transported towards the network is referred to as Upstream.

FIG. 1A illustrates Downstream NEXT and FEXT with the disturber loop transmitter (106) at the Network side (108), causes FEXT (104) and NEXT (105).

Figure 1B:
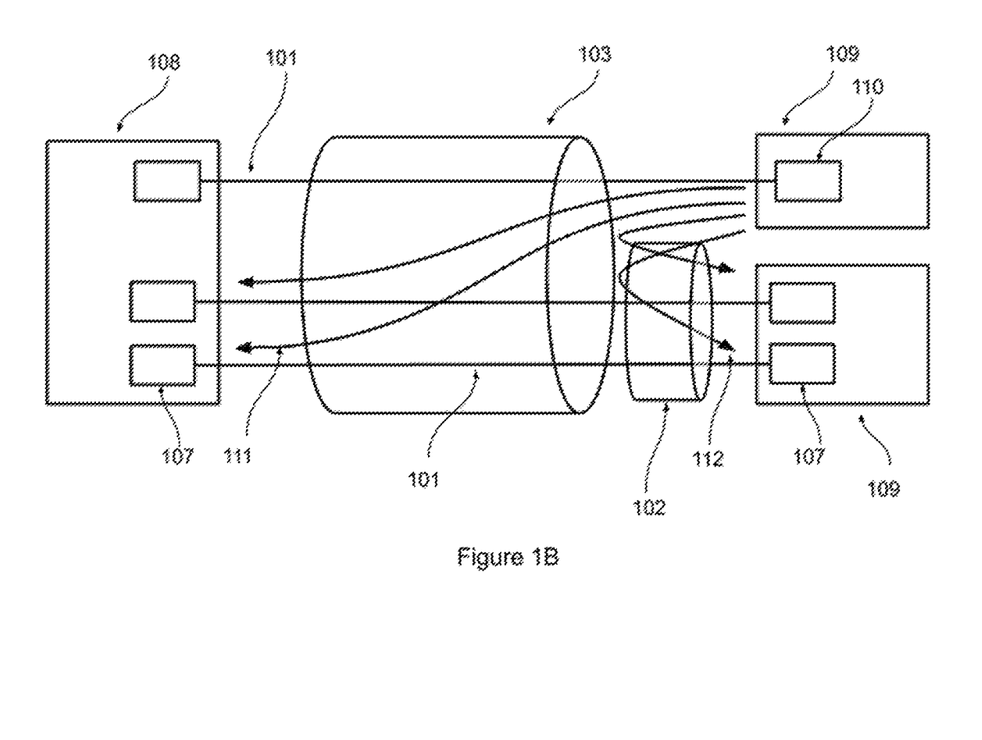

FIG. 1B illustrates in the upstream direction NEXT and FEXT are reversed. The disturber loop transmitter (110) at the User side (109), causes FEXT (111) and NEXT (112).

Conventional Crosstalk Cancellation

Previous solutions implemented Far-End Crosstalk (FEXT) cancellation through several techniques. One example, as incorporated in ITU standard ITU-T G.9701 (International Telecommunications Union, "Fast access to subscriber terminals (G.fast)—Physical layer specification," Corrigendum 5, ITU-T G.9701, 08/2018) also referred to as G.fast, is referred to as Vectoring.

DSL Circuits that are Vectored as a group, are referred to as the Vectored Group. The Loop components of a Vectored Group, are considered a Multiple Input/Multiple Output (MIMO) system and have all their downstream transmit signals processed jointly with destructive interference to cancel Far-End Crosstalk (FEXT).

Figure 2:
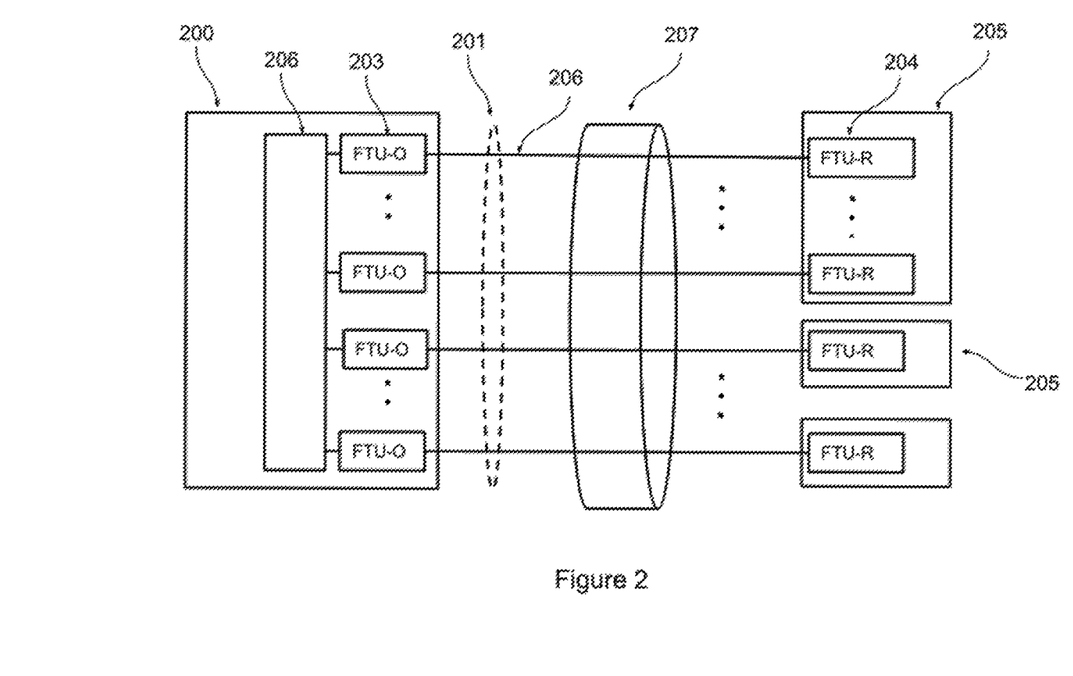
FIG. 2 illustrates the typical topologies of DSL deployments with a DSLAM, or ONU, or DPU on the network side and a CPE or DPU on the user side.

FIG. 2 illustrates a Vectored DSL system, it's components, and deployment configurations. A Vectored DSL System consists of a Digital Subscriber Line Access Multiplexer (DSLAM), Optical Network Unit (ONU), or Distribution Point Unit (DPU) (200), located on the Network side and connected to the DSL Circuit with a Transceiver referred to as a Fast Transceiver Unit at the Optical Network Unit (FTU-O) (203). The DSL Circuit is connected on the user side to a Fast Transceiver Unit at the Optical Remote Unit (FTU-R) (204) within Customer Premise Equipment (CPE) or Distribution Point Unit (DPU) (205) device using Twisted Wire-Pairs (206) located in binders (207).

In the Downstream direction multiple FTU-Os (203) that are jointly vectored by a Vector Processor (206) are referred to as being in a Vectored Group (201). In the Upstream direction, the Vector Processor (206) post-process the received signals of the Vector Group (201) to cancel Upstream FEXT. For the purpose of this specification, post-processing vectoring of FEXT on the receiver side, in the upstream direction will not be discussed as outside the scope.

Figure 3:
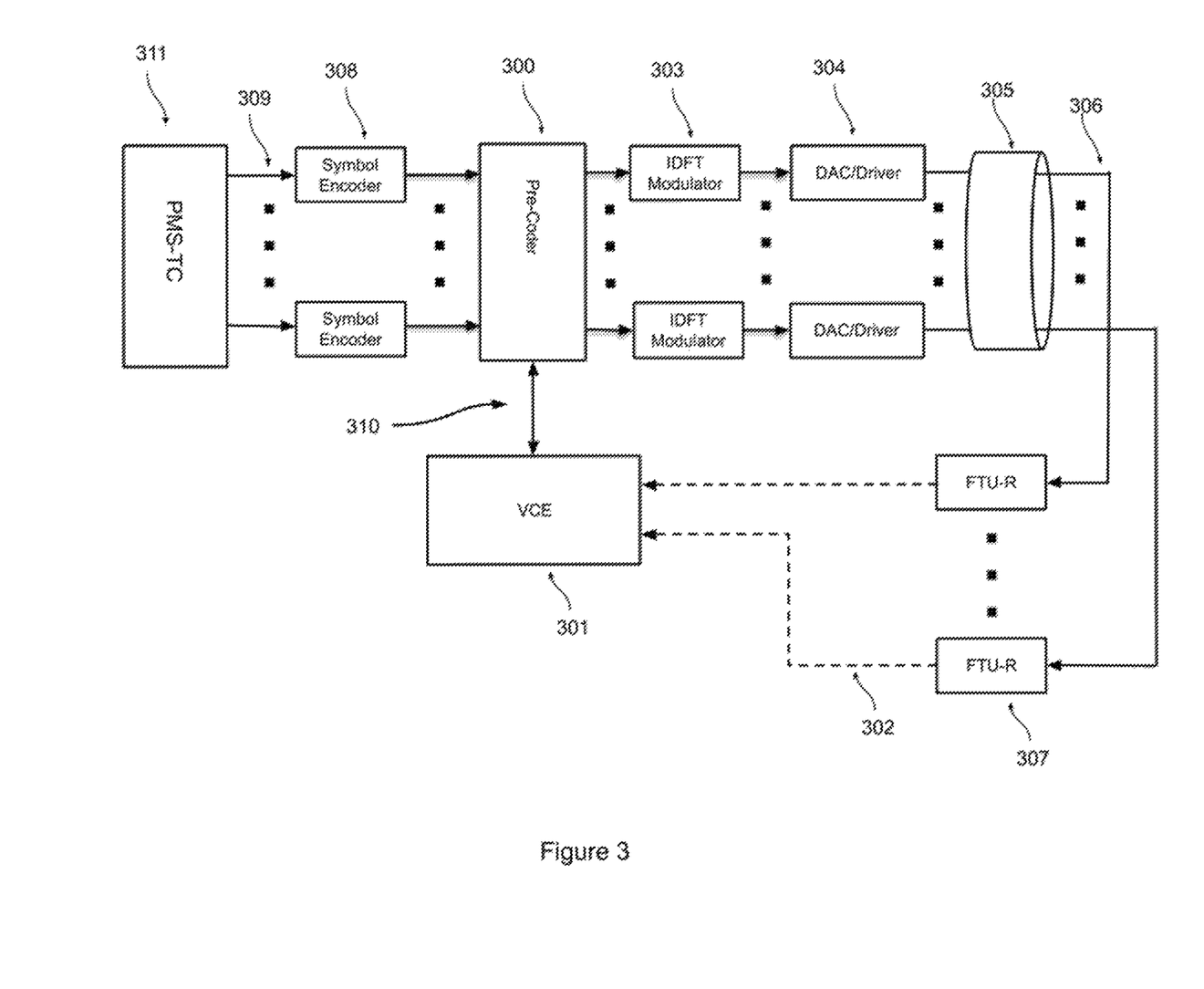
FIG. 3 illustrates an example schematic of a Vectored DSL transmitter as implemented for G.fast standard.

The following is a functional description of vectoring in the downstream direction, and refers to FIG. 3, which illustrates the functional blocks of the Physical Media Dependent (PMD) section of the Fast Transceiver Unit at the Optical Network Unit (FTU-O) with Vectored Discrete Multi-Tone (DMT) transmitters. At the input of each transmitter the Physical Media Specific Transmission Convergence (PMS-TC) sub-layer (311) presents a framed serial data stream (309) that encapsulates user data, synchronization, framing, and embedded operations and maintenance among other information to transmit. The Symbol Encoder (308) divides the data frame into bits and allocates them to modulate an assigned subcarrier of the DMT signal that is then encoded and mapped to a signal constellation point. This signal constellation point is then pre-coded by a vector that creates the destructive interference of FEXT at the input of the victim FTU-R, by the Pre-Coder (300). A pre-coded vector is generated for each DMT symbol based on the signal constellation point of each transmitter of the Vectoring Group, and applied to the channel matrix coefficients that describe the Multiple Input Multiple Output (MIMO) coupling, on a per subcarrier basis, between each member of the Vectoring Group. Pre-coding coefficients are provided by the Vectoring Control Entity (VCE) (301). The set of Pre-coded constellation points are then used to modulate each subcarrier of the DMT symbol by the Inverse Discrete Fourier Transform (IDFT) (303) modulator that also applies the necessary cyclic extension and windowing to the DMT symbol. Next a Digital to Analog Converter and Driver (304) couples the transmitter to the transmission medium or twisted wire-pair (306) and binder (305).

The Vectoring Control Entity (VCE)(301) performs channel estimation, on a per subcarrier basis, for each member of the Vectoring Group. Channel estimation is performed using primitives representing the transmitted signal provided by the Pre-Coder (300) over the Vectoring Interface (310) and vector feedback provided by the Fast Transceiver Unit at Remote end (FTU-R) (307) via the Vectoring Feedback Channel (302). Also using the Vectoring Interface (310), the Vectoring Control Entity provides the Pre-Coder with channel matrix coefficients. Because this method of Vectored DSL requires feedback from the Far-End it is referred to as Two-Sided Vectoring.

A complete description of greater detail can be found in "Ginis et al. "Vectored Transmission for Digital Subscriber Line Systems," IEEE Journal on Selected Areas in Communications, vol. 20, No. 5, June 2002, pp. 1085-1104, Institute of Electrical and Electronics Engineers," incorporated here by reference.

Problems with Prior Crosstalk Cancellation Techniques

Vectored DSL systems, as implemented in G.fast (ITU-T G.9701, 08/2018) for example, and illustrated in FIG. 3, in the downstream direction, the Vectoring Control Entity (301) requires that the Vectoring Feedback Channel (302) is established with the FTU-R before a channel model and crosstalk coefficients can be determined.

This implementation results in several limitations and drawbacks: One is an operator cannot reliably determine the speed or capacity of the DSL circuit, individually or bonded, or which DSL circuits are susceptible to FEXT before deploying a Far-End device such as CPE or DPU. This can significantly increase the cost and time related to deploying a new DSL circuit due to the uncertainty of achieving a specific data rate. Also, the Vectoring Feedback Channel requires bandwidth that reduces the effective upstream user data rate.

Furthermore, due to the nature of transmitting vector feedback over the Vectoring Feedback Channel (VFC) to the Vectoring Control Entity (VCE), a significant delay is incurred related to transport, aggregation, and processing of receiver primitives from the various FTU-Rs within the Vectored Group. This makes the Vectored DSL system less robust and responsive to changes in the loops due to temperature and mechanical changes, or sudden removal or shut down of one or more CPE or DPU devices that can result in increased interference due to de-correlated and misapplied pre-coding.

Another issue related to utilizing Far-End receive primitives, depending on the loop length and other interference, crosstalk may be highly attenuated and difficult to differentiate from other noise sources increasing the time and signal processing of the vector feedback by the Vectoring Control Entity (VCE) to accurately determine the channel model and the vectoring pre-coding coefficients.

Single-Ended Vectored DSL

This specification describes single-ended vectored DSL, which solves many of the problems associated with Two-Sided Vectoring approach described above by operating without a Vectoring Feedback Channel or in coordination with a Far-End receiver or device. Instead, this specification describes a Single-Ended Vectored DSL system that cancels FEXT through cancellation of NEXT.

A model is derived that describes crosstalk in twisted wire-pair communications loops and demonstrates the relationship between NEXT and FEXT and how canceling NEXT also cancels FEXT. A discussion of how NEXT and FEXT are modeled is presented in further detail below.

Figure 4A:
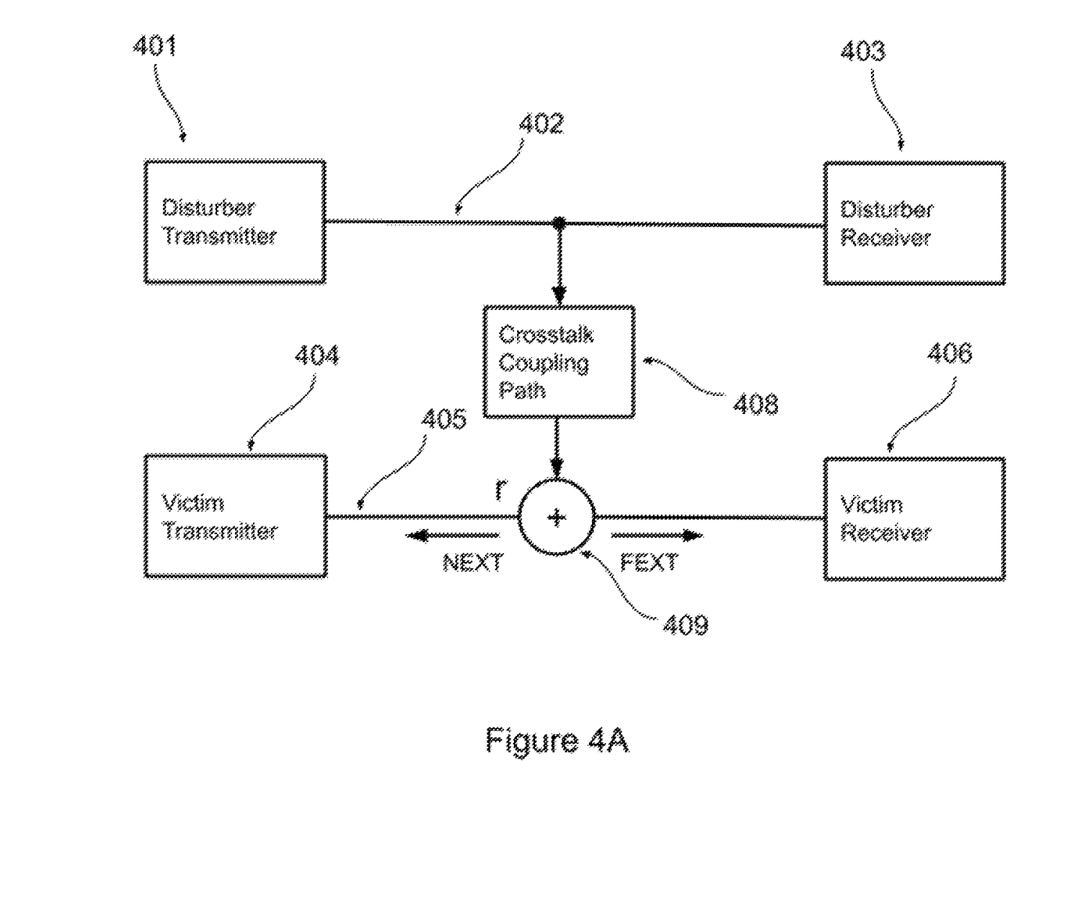
FIGS. 4A-4B are diagrams illustrating the crosstalk path that induces NEXT and FEXT and how they are cancelled in the victim.

FIG. 4A illustrates how crosstalk from Disturber Transmitter (401) couples from the Disturber Loop (402) through the Crosstalk Coupling Path (408) into the Victim Loop (405) generating NEXT and FEXT at point (409). The NEXT component of the Crosstalk is labeled "r". The Crosstalk Coupling Path can be distributed at multiple points between the Disturber and Victim Loops.

Figure 4B:
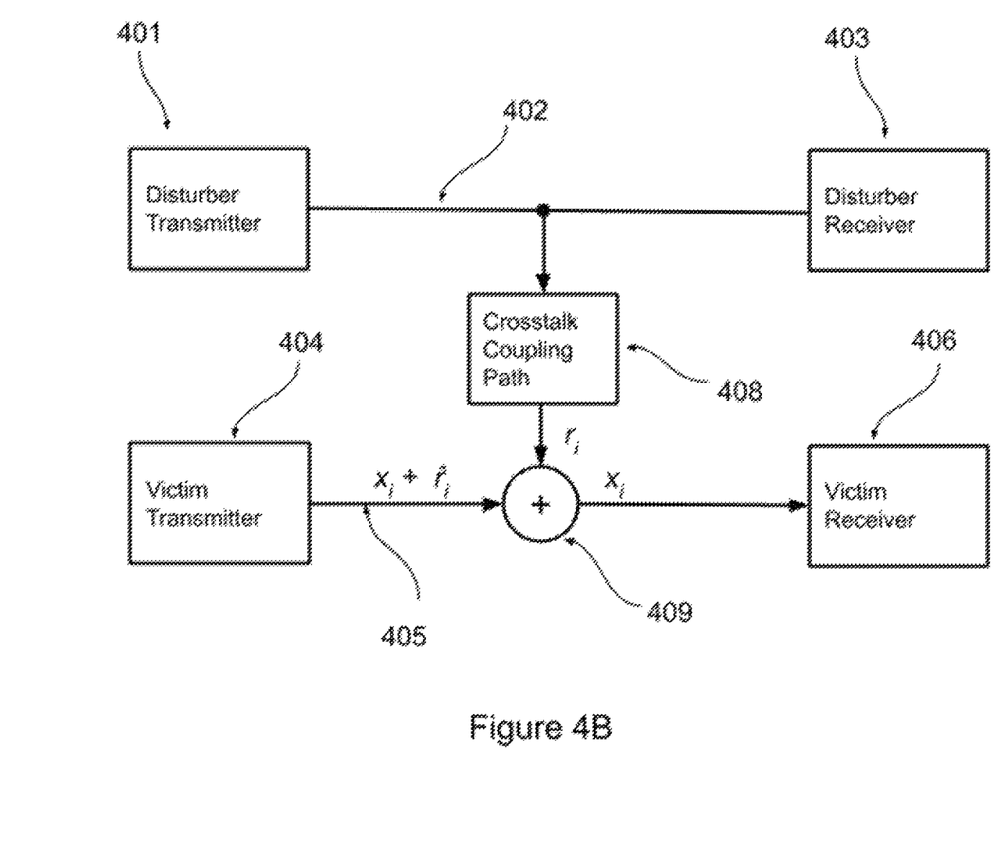

FIG. 4B illustrates how crosstalk is cancelled, both NEXT and FEXT components, by pre-coding, or pre-distorting, the Victim Transmitter (404) signal x with r̂ which is −1×r, and cancels crosstalk where it is coupled into the victim loop at (409), The single-ended vectored DSL technique operates similarly to the previously described Vectored DSL by treating all DSL Circuits across which crosstalk cancellation is applied, also referred to as the Vectoring Group, as a Multiple Input/Multiple Output (MIMO) system, and applies joint processing of all transmitter signals, with a pre-distorted signal that cancels crosstalk through destructive interference in the victim loops.

However, the difference in the single-ended vectored DSL approach to Single-Ended Crosstalk cancellation is that, instead of using Far-End receivers to determine the MIMO channel matrix, this specification describes using receivers co-located with the transmitters to detect crosstalk in the victim loops using NEXT instead of FEXT.

Using various techniques, the victim loop transmitter is pre-coded with distortion to cancel or minimize NEXT, which also cancels or minimized FEXT. These techniques essentially implement an echo canceler and treats crosstalk as an echo between the disturber loop and victim loop.

Furthermore, as receivers used by Single-Ended Vectoring to pre-code the vectored transmitters are collocated, eliminating the delay associated with transporting the Vector Feedback Channel thus reducing the time to adjust the pre-coded transmitters to compensate for changing loop conditions or the addition or removal of CPE or DPU.

Functional Description of Single-Ended Vectored DSL

The underlying principle of operation for the Single-Ended Vectored DSL crosstalk canceler is the relationship between NEXT and FEXT, and that through Pre-coding of the victim loop transmitter with a destructive signal that cancels NEXT, that the related FEXT is also cancelled or attenuated.

Single-Ended Vectored DSL operates in principal similar to an echo canceller, with NEXT as an echo sourced by the disturber loop and coupled into the Near-End of the victim loop. Therefore, for a Single-Ended Vectored DSL implementation the MIMO channel matrix between the various distributors and victim loops, describes the NEXT channels. This is in contrast to Two-Sided Vectoring previously described, for which the MIMO channel matrix describes the coupling between the Near-End disturber loops and Far-End victim loops.

Figure 5:
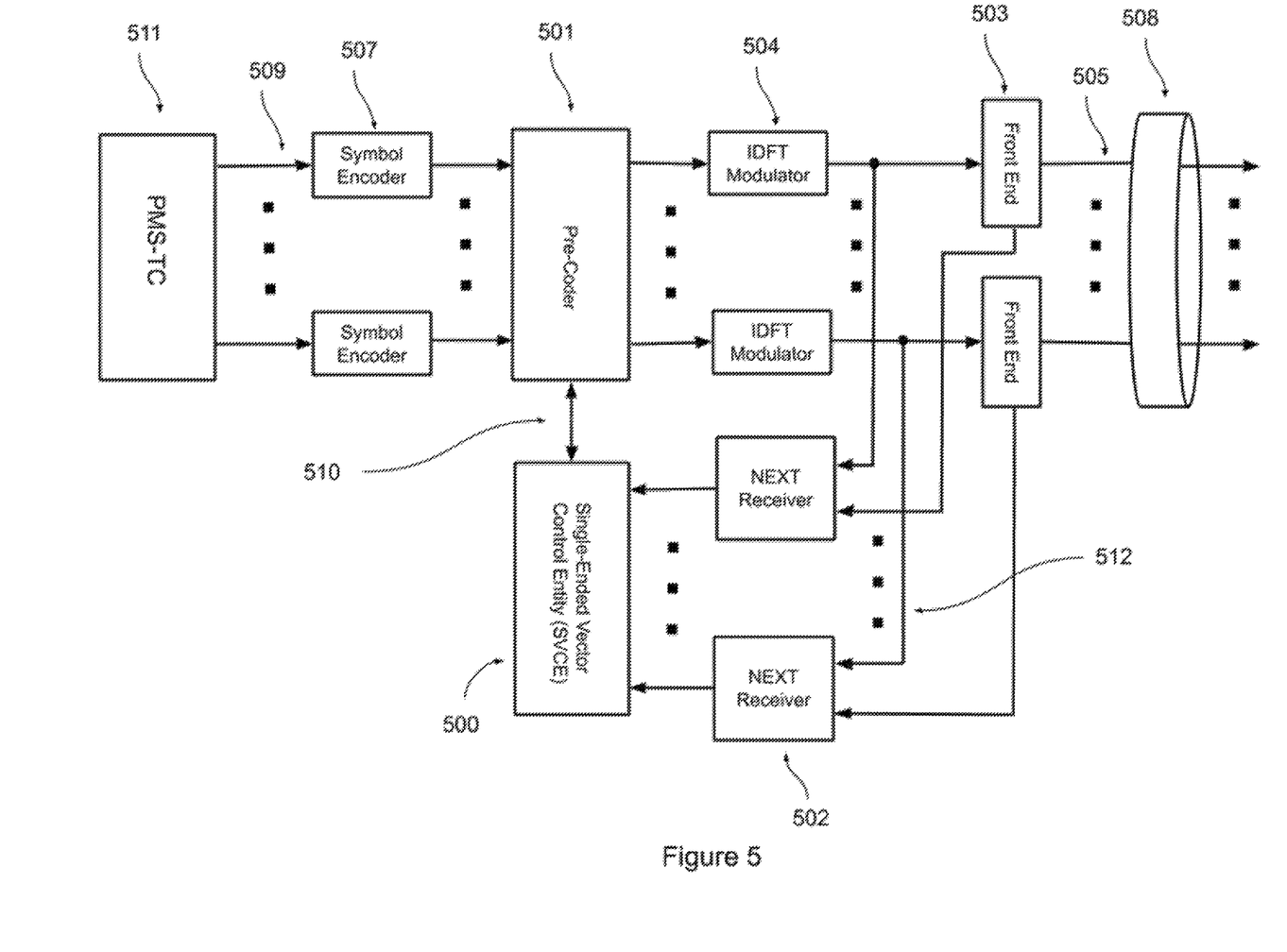
FIG. 5 illustrates an example schematic of a Single-Ended Vectored DSL Transmitter.

The following is a functional description of an example of Single-Ended Vectoring, and refers to FIG. 5 that illustrates the major functional blocks of the Physical Media Dependent (PMD) portion of Single-Ended Vectored Discrete Multi-Tone (DMT) transmitters that can be incorporated in an Optical Network Unit (Similar to an FTU-O) or within a Distribution Point Unit (DPU) located either at the network or a user end of the DSL circuit.

At the input of each transmitter the PMS-TC (Physical Media Specific Transmission Convergence sublayer) (511) presents a framed serial data stream (509) that encapsulates user data, synchronization, framing, and embedded operations and maintenance among other information to transmit. The Symbol Encoder (507) divides the data frame into bits and allocates them to modulate an assigned subcarrier of the DMT signal that are then encoded and mapped to a signal constellation point. This constellation point is then pre-coded by a vector that creates the destructive interference for NEXT, by the Pre-Coder (501). This pre-coded vector is generated for each DMT symbol based on the signal constellation point of each transmitter of the Vectoring Group, and applied to the NEXT MIMO channel matrix coefficients that describe the NEXT MIMO coupling, on a per subcarrier basis, between each member of the Vectoring Group. Pre-coding coefficients are provided by the Single-Ended Vectoring Control Entity (SVCE) (500) over the Vectoring Interface (510). The set of Pre-coded constellation points are then used to modulate each subcarrier of the DMT symbol by the Inverse Discrete Fourier Transform (IDFT) modulator (504) that also applies the necessary cyclic extension and windowing to the DMT symbol.

Figure 6:
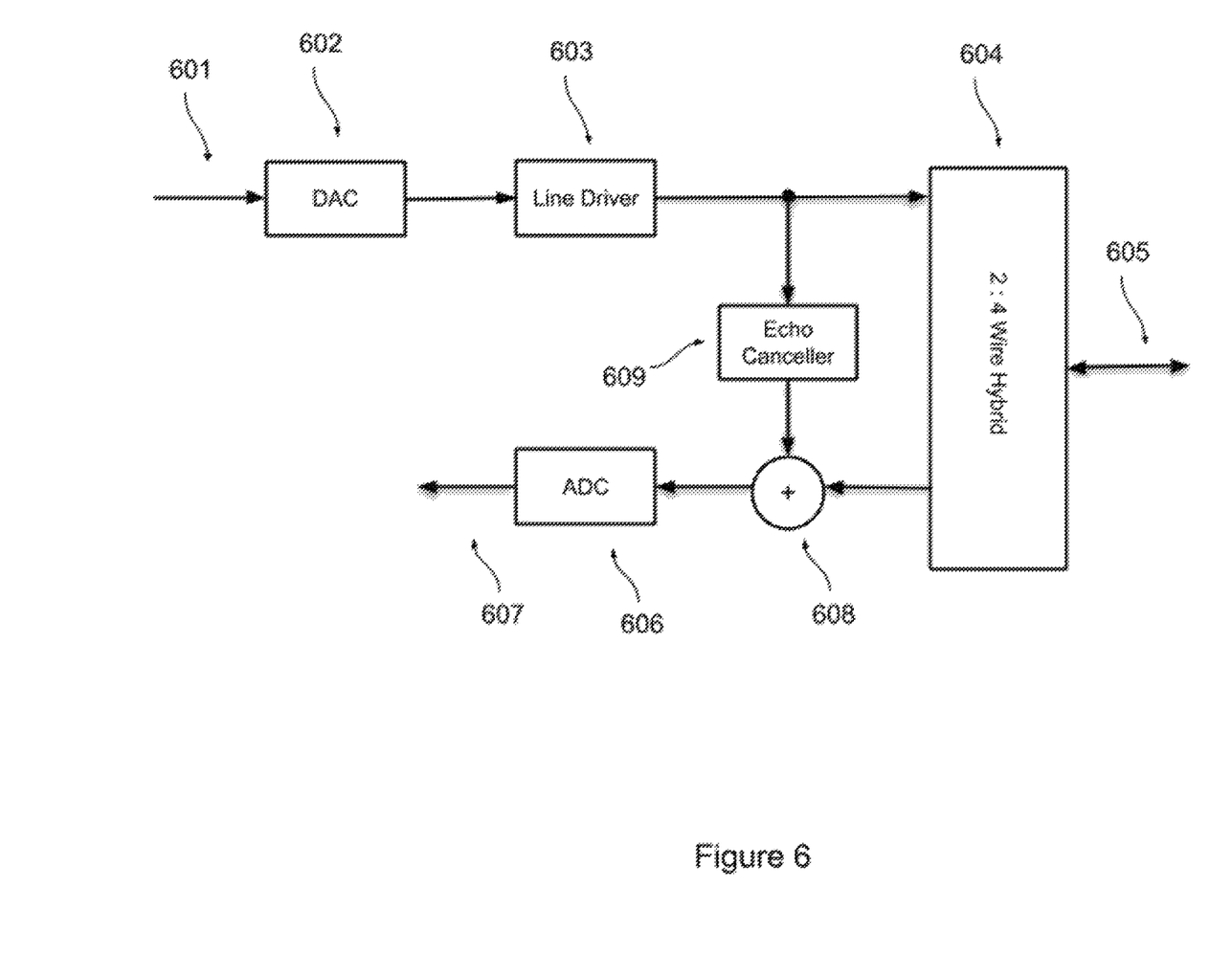
FIG. 6 illustrates an example schematic of a Single-Ended Vectored DSL Transmitter Front End.

The Front End is illustrated in FIG. 6. At the Front End (503) stage the digital transmit signal (601) is converted to an analog signal by a Digital to Analog Converter (DAC) (602) before it is amplified and coupled by a line driver (603) to the transmission medium or twisted wire-pair (505) and binder (508). The Front End (503) also provides coupling and Analog to Digital Conversion (ADC) (606) of received signals (506) for the NEXT Receiver. Transmit Echo Canceller (609) is used to attenuate or cancel self-echo from the transmitter.

The SVCE (500) performs crosstalk channel estimation between each victim loop and disturber loop, on a per subcarrier basis, for each member of the Vectoring Group. NEXT channel estimation is performed using the output from the NEXT Receiver (502) and correlating it with signals transmitted on the disturber loop. Based on the NEXT Channel estimation the Single-Ended VCE provides the Pre-Coder with NEXT MIMO channel matrix coefficients used to cancel NEXT and subsequently the associated FEXT. The output from the NEXT Receiver (502) provides the SVCE with the signals necessary to identify the sources of NEXT and perform channel estimation for each.

When NEXT, and by extension FEXT is cancelled, the output from the NEXT receiver will be minimized. The SCVE can monitor output of the NEXT Receiver to detect changes in the Crosstalk Domain.

Figure 7:
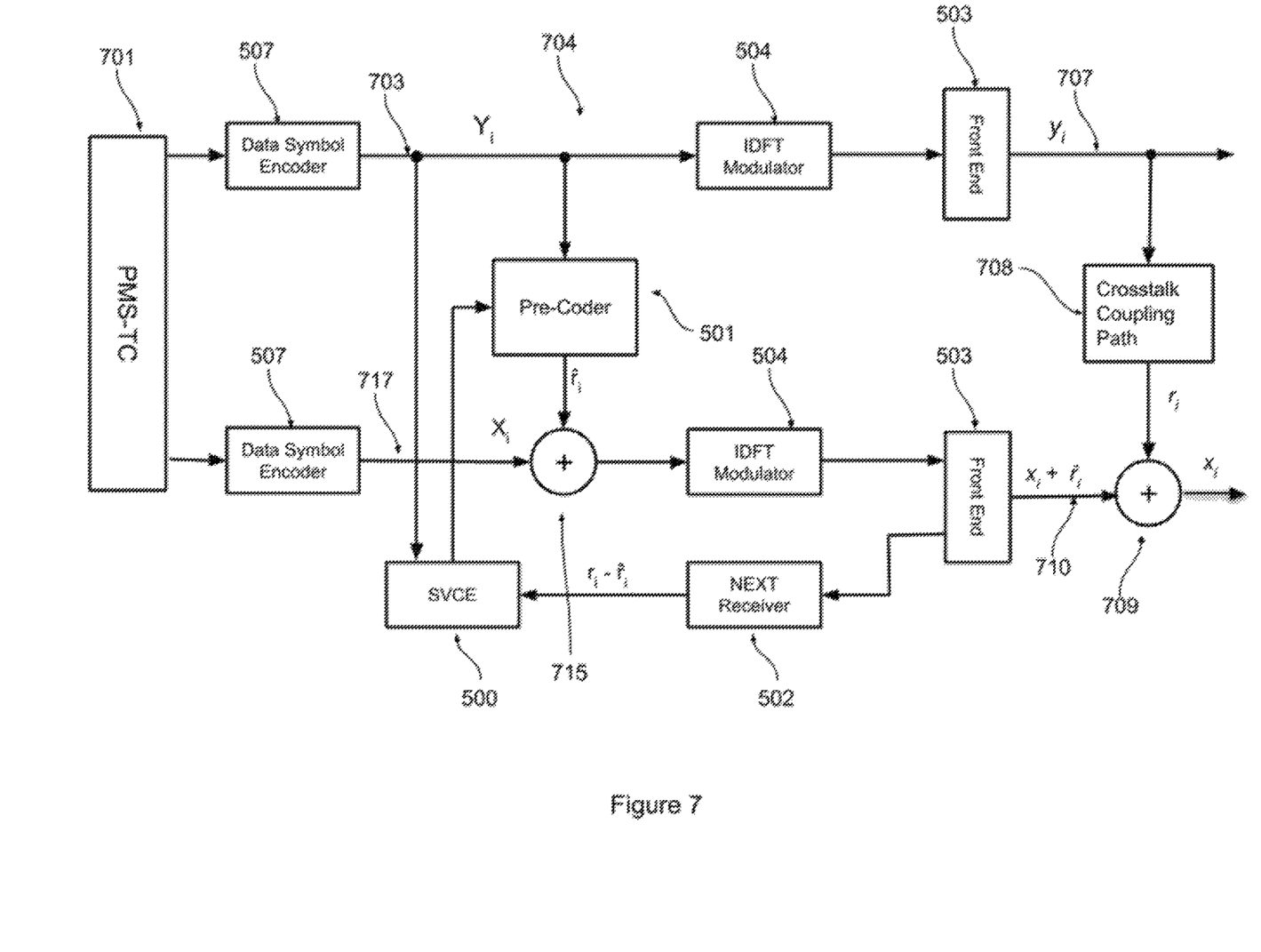
FIG. 7 illustrates an example schematic of a Single-Ended Vectored DSL Pre-Coder and SVC operation.

A more details functional description of how Single-Ended Vectoring operates is illustrated in FIG. 7 with a single disturber and victim.

The Disturber Loop (707) couples into the Victim Loop (710) at location (709) through the Crosstalk Coupling Path (708) and results in crosstalk $r_i$. $r_i$ is received by the NEXT receiver (502), a DMT receiver that through an FFT, demodulates $r_i$ into its constituent subcarriers. The SVCE (500) will correlate the signal transmitted by the disturber, on a per subcarrier basis, $Y_i$ (703) with $r_i$, to estimate a cancelation vector r̂, by programming the Pre-Coder (501) with the appropriate coefficients to generate the cancellation signal added to the victim transmission $X_i$ (717), until NEXT is cancelled, indicated by a minimizing the difference between $r_i$ and r̂, at the output of the NEXT Receiver 502).

The SVCE can use different algorithms to accomplish this such as Least Mean Squared (LMS).

During operation, changes in NEXT are expected to be gradual, the result of mechanical, and or temperature changes in the copper loops. The SVCE will detect these changes through changes in the output of the NEXT Receiver (413), increasing difference between $r_i$ and $\hat{r}$, and make marginal adjustments to the pre-coder NEXT MIMO channel matrix coefficients as necessary.

In the event the Far-End device is removed, powered down, or experiences failure of one or more DSL circuits, the SVCE can detect this and trigger the appropriate action to minimize or prevent interference to other DSL circuits in the Vector Group.

The SVCE may be a distributed function as in the case of multiple collocated and coordinated DPUs or DSLAMs.

Other Benefits of Single-Ended Vectored DSL

The use of Single-Ended Vectored DSL cancels NEXT, and subsequently FEXT. This is beneficial for DSL systems operating full-duplex with overlapping spectrum in the upstream and downstream directions. Single-Ended Vectored approach can also be used to cancel crosstalk in the upstream direction for applications with two or more bonded DSL circuits such as a DPU or CPE. Single-Ended Vectored approach applies to DSL circuits that utilize Frequency Domain Multiplexing, Time Domain Multiplexing, and Full Duplex DSL implementations. Single-Ended Vectored approach also applies to bonded DSL circuits, including those utilizing phantom pairs as described in U.S. Pat. No. 7,639,596, incorporated here by reference.

Additional Differences Between Single-Ended Vectored DSL and Conventional Solutions Crosstalk cancellation as implemented in G.fast (International Telecommunications Union, "Fast access to subscriber terminals (G.fast)—Physical layer specification," Corrigendum 5, ITU-T G.9701, 08/2018) using Vectoring (Ginis et al. "Vectored Transmission for Digital Subscriber Line Systems," IEEE Journal on Selected Areas in Communications, vol. 20, No. 5, June 2002, pp. 1085-1104, Institute of Electrical and Electronics Engineers) does not rely on any association between NEXT and FEXT. Typical Vectored DSL relies on receiver primitives from the Far-End of the victim loop to determine which circuits are the source of FEXT and a MIMO channel matrix. Once these are determined the VCE and Pre-Coder pre-distort the victim loop transmitter to create a signal that cancels FEXT at the Far-End receiver.

By contrast, Single-Ended Vectoring treats NEXT and FEXT as the same signal, thus through the cancellation of NEXT, FEXT is also cancelled without determining FEXT at the Far-End.

Single-Ended Vectoring has several advantages over the current implementation of Two-Sided Vectored DSL. First, because the receivers used to determine and measure crosstalk are collocated with the transmitters, this invention does not require an upstream Vector Feedback Channel interface thus maximizing the available data rate available to user data.

Second, delay related to transmitting vector feedback to the VCE are minimized reducing the time needed to update the Pre-coder in response to changes in the binder, either due to changes to the loops and or binder, their configuration, or the addition, removal, or configuration of other DSL circuits.

For full-duplex DSL systems, those with overlapping downstream and upstream spectrums, Single-Ended Vectoring offers benefits in reducing NEXT interference to the local receiver.

One other advantage of Single-Ended Vectoring is that it provides the ability to characterize the data rate capacity of loop from the network side taking FEXT into consideration without having to deploy a CPE or DPU at the Far-End of the loop. This feature allows the operator to deploy DSL with reduced uncertainty, in less time, and at a lower cost.

One other significant benefit of Single-Ended Vectoring using NEXT, is that NEXT is inherently less attenuated than FEXT, and therefore easier to measure in the presence of other noise and interference, reducing the MIMO channel estimation errors.

For implementations where all twisted wire-pairs within a Vector Group are co-terminated, at both ends, Single-Ended Vectoring can cancel FEXT and NEXT in both upstream and downstream directions, optimizing the achievable data rates across each DSL Circuit.

Modeling FEXT and NEXT

The DSL industry models for NEXT and FEXT are empirically derived and do not make any claims as to if there is any relationship between NEXT and FEXT. Establishing a relationship between NEXT and FEXT allows for the development of single-ended crosstalk cancellation as described above. This single-ended crosstalk canceller can cancel FEXT based on observed NEXT.

FEXT

The model for FEXT current induced in the victim tip wire due to the disturber tip wire is $$i_{Td \to Tv} = \frac{Z_0 \cdot j\omega}{2} \cdot I(0) \cdot |H(f, L)| \cdot \sum_{k=0}^{L/\Delta d} C_{Td-Tv}(k\Delta d),$$

where $Z_0$ is the loop impedance, $I(0)$ is the current injected by the transmitter on the disturbing line, $|H(f,L)|$ is the square-root of the magnitude of the loop insertion gain, $C_{Td-Tv}(k\Delta d)$ is the coupling capacitance between the disturber tip wire and the victim tip wire, and $\Delta d$ is the length of an incremental segment of the line. The value of $\Delta d$ needs to be small enough that the coupling capacitance between the two wires does not change appreciably over the length $\Delta d$.

The coupling capacitance is given a sign based on the orientations of the disturber and victim wires with respect to an imaginary x-axis that is perpendicular to the "longitudinal center" of the cable binder (which can be considered the z-axis).

The model tells us that we simply have to sum the unbalance capacitances (with appropriate sign to model polarity) over all of the k segments of length $\Delta d$, insert that result into the Bell Labs equation, and then multiply the result by the square root of the loop attenuation to compute the current in the tip of the victim caused by the tip of the disturber. Similar equations can be written for the other current components:

$$i_{Td \to Rv} = \frac{Z_0 \cdot j\omega}{2} \cdot I(0) \cdot |H(f, L)| \cdot \sum_{k=0}^{L/\Delta d} C_{Td-Rv}(k\Delta d),$$

-continued $$i_{Rd \to Tv} = \frac{Z_0 \cdot j\omega}{2} \cdot I(0) \cdot |H(f, L)| \cdot \sum_{k=0}^{L/\Delta d} C_{Rd-Tv}(k\Delta d),$$

$$i_{Rd \to Rv} = \frac{Z_0 \cdot j\omega}{2} \cdot I(0) \cdot |H(f, L)| \cdot \sum_{k=0}^{L/\Delta d} C_{Rd-Rv}(k\Delta d),$$

NEXT

The NEXT current models are similar to the FEXT models, but in this case, the current components in each of the segments Δd are attenuated by the loop back to the transmitter rather than onward to the receiver. This results in the low-k segments not being attenuated much before they get to the receiver, while the high-k segments are pretty much wiped out (due to the attenuation by two long lengths of line). This is intuitively satisfying given what we know about NEXT and its relative independence on loop length.

The current components are:

$$i_{Td \to Tv} = \frac{Z_0 \cdot j\omega}{2} \cdot I(0) \cdot \sum_{k=0}^{L/\Delta d} C_{Td-Tv}(k\Delta d) \cdot |H(f, k\Delta d)|^2$$

$$i_{Td \to Rv} = \frac{Z_0 \cdot j\omega}{2} \cdot I(0) \cdot \sum_{k=0}^{L/\Delta d} C_{Td-Rv}(k\Delta d) \cdot |H(f, k\Delta d)|^2$$

$$i_{Rd \to Tv} = \frac{Z_0 \cdot j\omega}{2} \cdot I(0) \cdot \sum_{k=0}^{L/\Delta d} C_{Rd-Tv}(k\Delta d) \cdot |H(f, k\Delta d)|^2 \text{ and}$$

$$i_{Rd \to Rv} = \frac{Z_0 \cdot j\omega}{2} \cdot I(0) \cdot \sum_{k=0}^{L/\Delta d} C_{Rd-Rv}(k\Delta d) \cdot |H(f, k\Delta d)|^2,$$

with all parameters as defined above for FEXT.

Finding the Capacitance

It is known that for parallel wire lines, the impedance $Z_0$ is given by the equation:

$$Z_0 = \frac{120}{\sqrt{\varepsilon_r}} \cdot \ln\left[\frac{h}{R} + \sqrt{\left(\frac{h}{R}\right)^2 - 1}\right],$$

where $\varepsilon_r$ is the dielectric constant of the line, h is half the distance between the two wires of the parallel line, and R is the radius of the wires. In our case, we have a pretty good idea what the impedance of the line is, so we can then solve this equation to find $\varepsilon_r$.

The capacitance C between the two wires in a parallel wire line is given by:

$$C = \frac{\pi \varepsilon_r L}{\ln\left[\frac{h}{R} + \sqrt{\left(\frac{h}{R}\right)^2 - 1}\right]},$$

where L is the length of the line. Using this equation and the geometry of the binder to find the distance h, we can calculate the capacitance between any two wires over a specified segment length. We just need to know how h varies with distance down the cable to compute the capacities, and therefore can model both FEXT and NEXT.

Determining how h varies with distance can be determined based on the geometry of a twisted pair. For example, consider a pair of wires that are both twisting as they proceed down a binder. Calculating the distances between either disturber wire and either victim wire is possible if the twist ratios are known. We start by denoting the angles of rotation of the disturber and victim as $\alpha_1$ and $\alpha_2$, where the pair with the higher twist ratio is associated with $\alpha_1$. We arbitrarily assign the rotation angles values of zero for a given orientation. Given the twist ratios, we know the rotation angles at any position along the cable (assuming the twisting is regular and both lines start in the zero position). We can then construct the derived variable $$\alpha = \alpha_1 - \alpha_2,$$

which is simply the difference between the angles of rotation. (Note that we do not distinguish between victim and disturber at this point.) We are essentially considering the situation from the perspective of the loop that is twisting fewer times per unit length. From that loop's point of view, the other loop isn't twisting quite so much.

The diameters of the wires are denoted as d, and the distance from the twist axis of one pair to the longitudinal axis of the binder is denoted as D1, while the distance from the twist axis of the other pair to the longitudinal axis of the binder is denoted as D2. (The assumption is that one line may be "further out" in the binder than the other.) The equations for the distances between the various wires in the two pairs can ultimately be written as:

$$d_{T1-T2} = \sqrt{A-B-C}$$

$$d_{T1-R2} = \sqrt{A+B+C}$$

$$d_{R1-T2} = \sqrt{A-B+C}$$

and $$d_{R1-R2} = \sqrt{A+B-C},$$

where $A=(D1+D2)^2+2d^2, B=2d(D1+D2)\sin\alpha,$ and $C=2d^2\cos\alpha.$

After the distances between wires have been calculated, the capacitances can be computed, which can then be used to calculate FEXT and NEXT.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In addition to the embodiments of the attached claims and the embodiments described above, the following embodiments are also innovative:

Embodiment 1 is a method, the method comprising: obtaining near end crosstalk (NEXT), caused by one or more disturber loops, at a transmit side of the disturber loops of a DSL system, wherein the obtained near end crosstalk is obtained from each of one or more victim loops; using the determined NEXT to generate a NEXT cancellation vector; and applying a precoded distortion to an outgoing data signal of each victim loop based on the NEXT cancellation vector to reduce NEXT and far end cross talk (FEXT) introduced into the respective victim loops.

Embodiment 2 is the method of embodiment 1, wherein applying the precoded distortion based on the NEXT cancellation vector comprises: dividing data of the outgoing data stream into bits and allocating the bits to modulate an assigned subcarrier of a Discrete Multi-Tone ("DMT") signal; mapping each of the subcarriers of the DMT signal to a single constellation point; precoding the constellation points using the NEXT cancelation vector; and using the pre-coded constellation points to modulate each subcarrier of the DMT signal.

Embodiment 3 is the method of any one of embodiments 1 through 2, wherein the NEXT cancellation vector is generated for each DMT symbol based on the constellation point of each transmitter of a vectoring group and NEXT multiple input multiple output ("MIMO") channel matrix coefficients that describe the NEXT MIMO coupling, on a per subcarrier basis, between each member of the vectoring group.

Embodiment 4 is the method of any one of embodiments 1 through 3, wherein generating the NEXT cancellation vector comprises: transforming the determined NEXT into constituent subcarriers; and correlating a signal transmitted by a disturber loop on a per subcarrier basis with the determined NEXT to estimate the cancellation vector by programing appropriate coefficients to generate a cancellation signal.

Embodiment 5 is the method of any one of embodiments 1 through 4, further comprising determining the coefficients, wherein determining the coefficient includes: detecting and demodulating NEXT measured from victim loops in the vectoring group and to pass NEXT receiver primitives for each subcarrier to a single-ended vectoring control entity ("SVCE"); and performing, by the SVCE, crosstalk channel estimation between each victim loop and disturber loop, on a per subcarrier basis, for each member of the vectoring group; and based on the NEXT channel estimation, providing a pre-coder with the NEXT MIMO channel matrix coefficients.

Embodiment 6 is the method of any one of embodiments 1 through 5, wherein crosstalk channel estimation is performed using primitive provided by each NEXT receiver and received transmit primitives.

Embodiment 7 is the method of any one of embodiments 1 through 6, further comprising: adjusting the NEXT MIMO channel matrix coefficients in response to detected changes in NEXT.

Embodiment 8 is a single-ended vectoring system comprising: a plurality of near end cross talk ("NEXT") receivers that receive signals from a corresponding plurality of victim loops of a DSL system, wherein the NEXT receiver are collocated with the transmitters of one or more disturber loops of the DSL system; a single-ended vectoring control entity ("SVCE") that receives NEXT components from the NEXT receivers and uses the NEXT components to generate NEXT multiple input multiple output ("MIMO") channel matrix coefficients; and a pre-coder that receives an encoded data stream for transmission and uses the received MIMO channel matrix coefficients received from the SVCE to modulate each subcarrier of the Discrete Multi-Tone ("DMT") signal with a NEXT cancellation signal for each victim loop of the plurality of victim loops that reduces both NEXT and far end cross talk (FEXT).

Embodiment 9 is the system of embodiment 8, wherein the SVCE generates NEXT MIMO channel matrix coefficients based on crosstalk channel estimation performed using the NEXT receiver primitives received from the NEXT receivers.

Embodiment 10 is the system of any one of embodiments 8 through 9, further comprising: a plurality of symbol encoders that divide an input framed serial data stream into bits and allocates the bites to modulate an assigned subcarrier of the DMT signal, wherein each subcarrier is mapped to a signal constellation point, wherein each signal constellation point is pre-coded by the pre-coder with the NEXT cancellation signal; and a plurality of inverse discrete Fourier transform ("IDFT") modulators, wherein the pre-coded constellation points are used to modulate each subcarrier of the DMT symbol by the IDFT modulators.

Embodiment 11 is the system of any one of embodiments 8 through 10, wherein the front end comprises: a digital analog converter that converts a modulated transmit signal to an analog signal; a line driver that amplifies the analog signal; a wire converter that couples the amplified analog signal to a transmission medium; and an analog to digital convertor of received signals for transmission to the NEXT receivers.

Embodiment 12 is a method comprising: receiving, at respective receivers located at a transmit side of one or more victim loops, a measure of near-end crosstalk sourced from one or more disturber loops of a DSL system; demodulating the received measure of near-end crosstalk into constituent subcarriers; correlating transmissions signals of the one or more disturber loops, on a per subcarrier basis, with components of the received measure of near-end crosstalk; estimating a cancellation vector based on the correlation; and using the cancellation vector to generate a respective cancellation signal to be added to each victim loop, where the cancellation signal for a particular victim loop destructively interferes with the near-end crosstalk of that victim loop.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining near end crosstalk (NEXT), caused by one or more disturber loops, at a transmit side of the disturber loops of a DSL system, wherein the obtained near end crosstalk is obtained from each of one or more victim loops;
   using the determined NEXT to generate a NEXT cancellation vector, wherein the NEXT cancellation vector is generated using NEXT multiple input multiple output ("MIMO") channel matrix coefficients generated from components of the determined NEXT; and
   applying a precoded distortion to an outgoing data signal of each victim loop based on the NEXT cancellation vector to reduce NEXT and far end cross talk (FEXT) introduced into the respective victim loops, wherein applying the precoded distortion based on the NEXT cancellation vector comprises:
      dividing data of the outgoing data stream into bits and allocating the bits to modulate an assigned subcarrier of a Discrete Multi-Tone ("DMT") signal;
      mapping each of the subcarriers of the DMT signal to a single constellation point;
      precoding the constellation points using the NEXT cancelation vector; and
      using the pre-coded constellation points to modulate each subcarrier of the DMT signal.

2. The method of claim 1, wherein the NEXT cancellation vector is generated for each DMT symbol based on the constellation point of each transmitter of a vectoring group and the NEXT multiple input multiple output ("MIMO") channel matrix coefficients that describe the NEXT MIMO coupling, on a per subcarrier basis, between each member of the vectoring group.

3. The method of claim 2, wherein generating the NEXT cancellation vector comprises:
   transforming the determined NEXT into constituent subcarriers; and
   correlating a signal transmitted by a disturber loop on a per subcarrier basis with the determined NEXT to estimate the cancellation vector by programing appropriate coefficients to generate a cancellation signal.

4. The method of claim 1, further comprising determining the coefficients, wherein determining the coefficient includes:
   detecting and demodulating NEXT measured from victim loops in the vectoring group and to pass NEXT receiver primitives for each subcarrier to a single-ended vectoring control entity ("SVCE"); and
   performing, by the SVCE, crosstalk channel estimation between each victim loop and disturber loop, on a per subcarrier basis, for each member of the vectoring group; and
   based on the NEXT channel estimation, providing a pre-coder with the NEXT MIMO channel matrix coefficients.

5. The method of claim 3, wherein crosstalk channel estimation is performed using primitive provided by each NEXT receiver and received transmit primitives.

6. The method of claim 1, further comprising: adjusting the NEXT MIMO channel matrix coefficients in response to detected changes in NEXT.

7. A single-ended vectoring system comprising:
   a plurality of near end cross talk ("NEXT") receivers that receive signals from a corresponding plurality of victim loops of a DSL system, wherein the NEXT receiver are collocated with the transmitters of one or more disturber loops of the DSL system;
   a single-ended vectoring control entity ("SVCE") that receives NEXT components from the NEXT receivers and uses the NEXT components to generate NEXT multiple input multiple output ("MIMO") channel matrix coefficients; and
   a pre-coder that receives an encoded data stream for transmission and uses the received MIMO channel matrix coefficients received from the SVCE to modulate each subcarrier of the Discrete Multi-Tone ("DMT") signal with a NEXT cancellation signal for each victim loop of the plurality of victim loops that reduces both NEXT and far end cross talk (FEXT).

8. The system of claim 7, wherein the SVCE generates NEXT MIMO channel matrix coefficients based on crosstalk channel estimation performed using the NEXT receiver primitives received from the NEXT receivers.

9. The system of claim 7, further comprising:
   a plurality of symbol encoders that divide an input framed serial data stream into bits and allocates the bites to modulate an assigned subcarrier of the DMT signal, wherein each subcarrier is mapped to a signal constellation point, wherein each signal constellation point is pre-coded by the pre-coder with the NEXT cancellation signal; and
   a plurality of inverse discrete Fourier transform ("IDFT") modulators, wherein the pre-coded constellation points are used to modulate each subcarrier of the DMT symbol by the IDFT modulators.

10. The system of claim 7, wherein the front end comprises:
    a digital analog converter that converts a modulated transmit signal to an analog signal;
    a line driver that amplifies the analog signal;
    a wire converter that couples the amplified analog signal to a transmission medium; and
    an analog to digital convertor of received signals for transmission to the NEXT receivers.

11. A method comprising:
    receiving, at respective receivers located at a transmit side of one or more victim loops, a measure of near-end crosstalk (NEXT) sourced from one or more disturber loops of a DSL system;
    demodulating the received measure of NEXT into constituent subcarrier components;
    correlating transmissions signals of the one or more disturber loops, on a per subcarrier basis, with the corresponding demodulated components of the received measure of NEXT;
    estimating a NEXT cancellation vector based on the correlation; and
    using the cancellation vector to generate a respective NEXT cancellation signal to be added to each victim loop, where the cancellation signal for a particular victim loop destructively interferes with the near-end crosstalk of that victim loop, wherein adding the respective cancellation signal to each victim loop comprises:
       mapping each victim loop signal to a corresponding constellation point;
       precoding the constellation points using the cancellation signal; and
       using the pre-coded constellation points to modulate each victim loop signal.

* * * * *